(12) United States Patent
Zaltsman

(10) Patent No.: US 9,031,142 B2
(45) Date of Patent: May 12, 2015

(54) DIGITAL UP CONVERTER

(71) Applicant: Harmonic, Inc., San Jose, CA (US)

(72) Inventor: Ariel Zaltsman, Raanana (IL)

(73) Assignee: Harmonic, Inc., San Jose, CA (US)

( * ) Notice: Subject to any disclaimer, the term of this patent is extended or adjusted under 35 U.S.C. 154(b) by 0 days.

(21) Appl. No.: 14/040,690

(22) Filed: Sep. 29, 2013

(65) Prior Publication Data

US 2015/0092870 A1  Apr. 2, 2015

(51) Int. Cl.
*H04L 27/16* (2006.01)
*H04B 1/04* (2006.01)

(52) U.S. Cl.
CPC .............. *H04L 27/16* (2013.01); *H04B 1/0483* (2013.01)

(58) Field of Classification Search
CPC ... H04L 1/0054; H04L 1/0059; H04L 1/0071; H04L 27/2631; H04L 1/0068; H04L 1/06; H04L 2025/03414; H04L 2025/03426; H04L 25/03159; H04L 25/03834; H04L 27/2602; H04L 27/2621; H04L 25/0202; H04L 25/022; H04L 25/0222; H04L 25/0236; H04L 25/0248; H04L 25/03101; H04L 5/0007; H04L 5/003; H04L 5/0037; H04L 5/14; H04L 25/0242; H04L 27/2626; H04L 27/2634
See application file for complete search history.

(56) References Cited

U.S. PATENT DOCUMENTS

| | | | |
|---|---|---|---|
| 2004/0142696 A1* | 7/2004 | Saunders et al. | 455/450 |
| 2008/0240275 A1* | 10/2008 | Cai | 375/260 |
| 2008/0316912 A1* | 12/2008 | Al Adnani | 370/210 |
| 2009/0046790 A1* | 2/2009 | Soliman | 375/260 |
| 2010/0109928 A1* | 5/2010 | Chen | 341/157 |
| 2010/0232395 A1* | 9/2010 | McLeod et al. | 370/335 |
| 2011/0211541 A1* | 9/2011 | Yuk et al. | 370/329 |
| 2012/0120911 A1* | 5/2012 | Miyoshi et al. | 370/330 |
| 2013/0034189 A1* | 2/2013 | Ye | 375/298 |
| 2014/0169501 A1* | 6/2014 | Nazarathy et al. | 375/316 |

* cited by examiner

*Primary Examiner* — Hirdepal Singh

(74) *Attorney, Agent, or Firm* — Brokaw Patent Law PC; Christopher J. Brokaw

(57) ABSTRACT

A method that includes providing to multiple inverse fast Fourier transform (IFFT) and polyphase circuits multiple baseband channels so that different IFFT and polyphase circuits receive different sets of baseband channels; applying IFFT operations and the polyphase filtering operations by the multiple IFFT and polyphase circuits to provide multiple converted channels; wherein different IFFT and polyphase circuits output different sets of converted channels that at least partially populate different IFFT grids that comprise different frequency bins; wherein frequency bins of a same IFFT grid of the different IFFT grids are spaced apart from each other by a first spacing; frequency shifting one or more sets of the converted channels to provide an output set of sub-channels; wherein the output set of sub-channels at least partially populates an output frequency grid in which output sub-channels originating from different sets of converted channels are of interleaving frequencies and in which the spacing between adjacent output frequency bins is smaller than the spacing between frequency bins of each IFFT grid; and combining the sub-channels of the output set of sub-channels to provide an interleaved output channel.

14 Claims, 12 Drawing Sheets

DIGITAL UP CONVERTER

A digital up converter (DUC) includes multiple (L) inputs and one output. The purpose of the DUC is to up convert numerous channels received via the L inputs—each channel to a different frequency location and to add these frequency converted channels to a single interleaved output channel. Without loss of generality the 'channels' are sometimes referred here as QAM channels.

A straight forward way to up convert numerous channels is by simply up convert each channel independently to its destined frequency (carrier) and finally combine all channels. The complexity of this option is high and proportional to square of number of channels.

It is known that an N-sized Inverse fast Fourier transform (IFFT) filter can up convert up to N channels with complexity of only N*log N. The IFFT filter output signals that populate an IFFT grid of evenly spaced channel carriers, wherein the spacing between adjacent channels is driven from the sampling rate of the IFFT filter. In a nut shell, the spacing equals the sampling rate.

High sampling rate indicates that the IFFT grid spacing is high and results in an inefficient usage of the frequency domain and a very high bandwidth which results in an expensive solution.

There is a growing need to provide a digital up converter that will be able to provide a better tradeoff between sampling rate and bandwidth.

SUMMARY

According to various embodiments of the invention there are provided digital up converters and methods for digital up-conversion.

According to an embodiment of the invention there is provided a digital up converter that may include (a) a first inverse fast Fourier transform (IFFT) and polyphase circuit that is arranged to receive a first set of baseband channels, to apply an IFFT operation and a polyphase filtering operation to provide a first set of converted channels that at least partially populates a first IFFT grid that comprises first frequency bins that are spaced apart from each other by a first spacing; (b) a second IFFT and polyphase circuit that is arranged to receive a second set of baseband channels, to apply the IFFT operation and the polyphase filtering operation to provide a second set of converted channels that at least partially populates a second IFFT grid that comprises second frequency bins that are spaced apart from each other by the first spacing; (c) a frequency shifting module that is arranged to frequency shift at least one of the first set of converted channels and the second set of converted channels to provide an output set of sub-channels that at least partially populates an output grid that comprises output frequency bins that are spaced apart from each other by an output spacing that is smaller than the first spacing; wherein output sub-channels originating from the first set of converted channels and output sub-channels originating from the second set of the converted channels are of interleaving frequencies; and (d) a combining circuit that is arranged to combine the output sub-channels to provide an interleaved output channel.

The output spacing may be one half of the first spacing.

The frequency shifting module may be arranged to frequency shift only one of the first and second sets of converted channels.

The frequency shifting module may be arranged to frequency shift each one of the first and second sets of converted channels.

The digital up converter may include an interface that may be arranged to receive multiple baseband channels, the multiple baseband channels comprise the first and second sets of baseband channels, to direct the first set of baseband channels to the first IFFT and polyphase circuit and to direct the second set of baseband channels to the second IFFT and polyphase circuit.

The interface may include baseband frequency shifters that may be arranged to perform intra-frequency bin frequency shift of baseband channels according desired frequencies of output sub-channels originating from the baseband channels.

The digital up converter may include a pilot channel circuit arranged to supply information to be mapped to pilot bands of the interleaved output channel.

The first frequency bin may be wider than at least twice a bandwidth of a baseband channel of the first set of baseband frequency channels.

The first frequency bin may be wider than a bandwidth of a baseband channel of the first set of baseband frequency channels and may be narrower than twice the bandwidth of the baseband channel of the first set of baseband frequency channels.

The first and second IFFT and baseband circuits may belong to a group of multiple IFFT and baseband circuits, the group may include at least one additional IFFT and baseband circuit that differs from the first and second IFFT and baseband circuits. Different IFFT and polyphase circuits are arranged to receive different sets of baseband channels, to apply the IFFT operation and the polyphase filtering operation to provide different sets of converted channels that at least partially populate different IFFT grids that comprise different frequency bins, wherein frequency bins of a same IFFT grid of the different IFFT grids are spaced apart from each other by a first spacing; wherein the frequency shifting module that may be arranged to frequency shift multiple one or more sets of converted channels to provide the output set of sub-channels, the output set of sub-channels at least partially populates the output frequency grid, wherein output sub-channels originating from different sets of converted channels are of interleaving frequencies.

The number of IFFT and polyphase circuits may exceed three.

The output spacing may be smaller than one third, one forth, one fifth of the first spacing.

The frequency shifting module may include, for at least one pair of symmetrically frequency shifted polyphase filters, (a) a first adder for adding real signals of the first and second sets of converted channels to provide first adder output signals, (b) a second adder for adding imaginary signals of the first and second sets of converted channels to provide second adder output signals; (c) a first subtraction unit for subtracting real signals of the first set of converted channels from real signals of the second set of converted channels to provide first subtraction unit output signals; (d) a second subtraction unit for subtracting imaginary signals of the first set of converted channels from imaginary signals of the second set of converted channels to provide second subtraction unit output signals; and (e) a set of four multipliers that are arranged to generate the output set of sub channels by multiplying the first adder output signals, the second adder output signals, the first subtraction unit output signals, the second subtraction unit output signals by sinusoidal signals.

According to an embodiment of the invention there is provided a method that may include: (a) providing to multiple inverse fast Fourier transform (IFFT) and polyphase circuits multiple baseband channels so that different IFFT and polyphase circuits receive different sets of baseband channels; (b) applying IFFT operations and the polyphase filtering operations by the multiple IFFT and polyphase circuits to provide multiple converted channels; wherein different IFFT and polyphase circuits output different sets of converted channels that at least partially populate different IFFT grids that comprise different frequency bins; wherein frequency bins of a same IFFT grid of the different IFFT grids are spaced apart from each other by a first spacing; (c) frequency shifting one or more sets of the converted channels to provide an output set of sub-channels; wherein the output set of sub-channels at least partially populates an output frequency grid in which output sub-channels originating from different sets of converted channels are of interleaving frequencies and in which the spacing between adjacent output frequency bins is smaller than the spacing between frequency bins of each IFFT grid; and (d) combining the sub-channels of the output set of sub-channels to provide an interleaved output channel.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
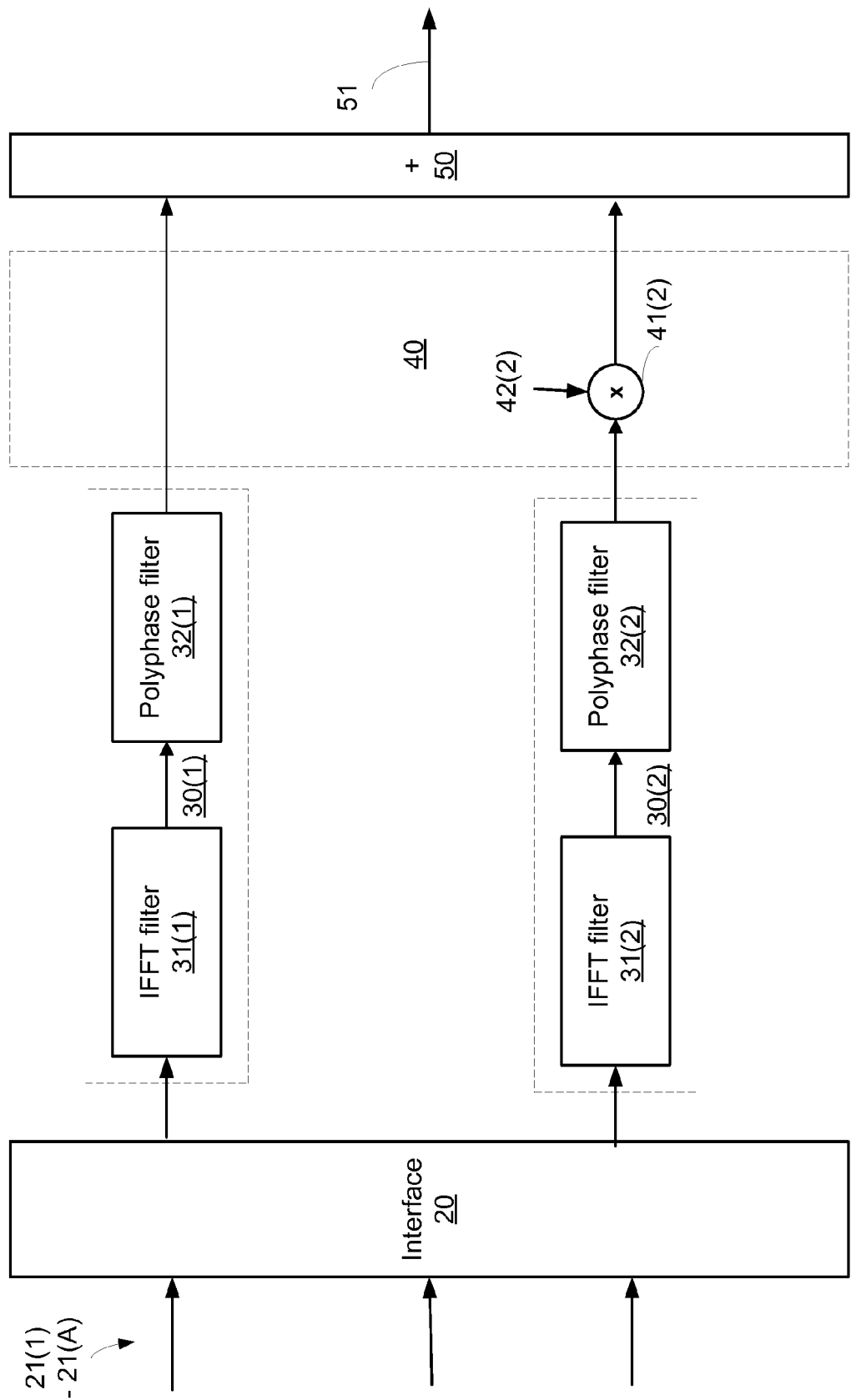
FIG. 1 illustrates a digital up converter according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method.

Any reference in the specification to a system should be applied mutatis mutandis to a method that may be executed by the system.

According to an embodiment of the invention there is provided a digital up converter that include multiple IFFT filters that operate on different channels out of multiple input channels and IFFT converted channels outputted from these different IFFT filters are frequency shifted to provide an interleaved output channel. The spectrum of the interleaved output channel include frequency bins that are at least partially populated wherein the Denoting the IFFT filter input sampling rate as being equal to X Hertz, thus each IFFT grid include frequency bins that are spaced apart by a spacing of X Hertz.

If the digital up converter outputs an interleaved output channel that includes M output sub-channels then the spectrum of that interleaved output channel at least partially populates an output grid that include frequency bins that are spaced apart by a spacing that equals X/M Hertz.

Each frequency bin is band-limited. The bandwidth of each frequency bin is denoted Y Hertz. In case Y>X/M the output frequency bins are overlapping. Namely, the spacing of the output grid is X/M Hertz while each frequency bin bandwidth is larger than X/M.

It is noted that when partially overlapping output frequency bins are provided, the channels may be allocated to prevent overlapping channels that may result in channel data corruption. According to an embodiment of the invention the allocation of channels can be made automatically or can at least partially affected by input provided by a user.

Each frequency bin can be loaded with one or several channels (such as QAM channels or any other modulated channel), this is dependent on the choice of X and Y and the required channels bandwidth of the channels.

Figure 10:
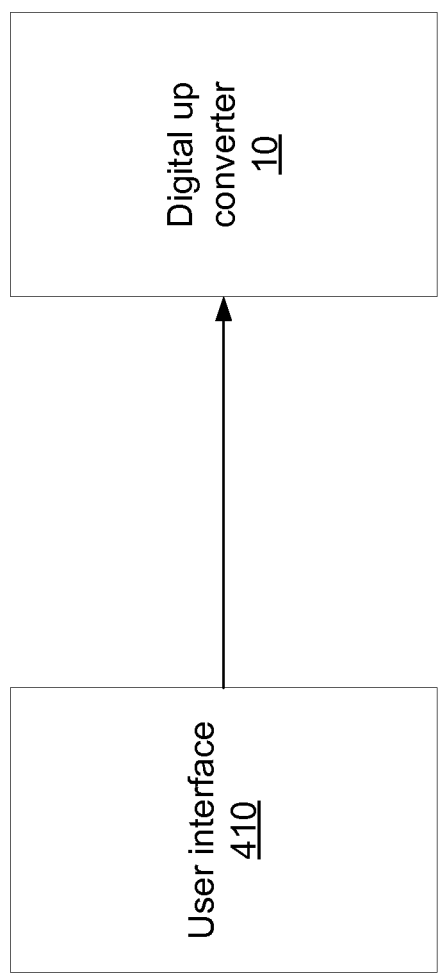
FIG. 10 illustrates a digital up converter and a user interface for programming the digital up converter according to an embodiment of the invention.

The allocations of channels can be programmed by a user interface that configured the digital up converter accordingly. The configuration can include determining frequency shifts, number of guard bands, and the like. FIG. 10 illustrates a user interface 410 that is used to program a digital up converter 10 according to an embodiment of the invention.

The digital up converter includes multiple IFFT and polyphase circuits. An IFFT and polyphase circuit performs frequency conversion by applying an IFFT conversion and then performs frequency shaping by performing a polyphase filtering operation. An IFFT and polyphase circuit may include an IFFT filter that is followed by a polyphase filter.

Dual IFFT and Polyphase Circuit DUT

FIG. 1 illustrates a digital up converter 10 according to an embodiment of the invention.

The digital up-converter 10 includes an interface 20 that is followed by a pair of IFFT and polyphase circuits 30(1) and 30(2) that are followed by a frequency shifting module 40 that is followed by a combiner 50.

The interface 20 has one or more inputs such as multiple inputs 21(1)-21(A), a being a positive integer. It has two outputs—one provides a first set of base band channels to first IFFT and polyphase circuit 30(1) and the second provides a second set of baseband channels to second IFFT and polyphase circuit 30(2).

The first IFFT and polyphase circuit 30(1) is arranged to receive the first set of baseband channels, to apply an IFFT operation (by IFFT filter 31(1)) to be followed by applying a polyphase filtering operation (by polyphase filter 32(1)) to provide a first set of converted channels. The first set of converted channels at least partially populates a first IFFT grid that includes first frequency bins that are spaced apart from each other by a first spacing.

Figure 2:
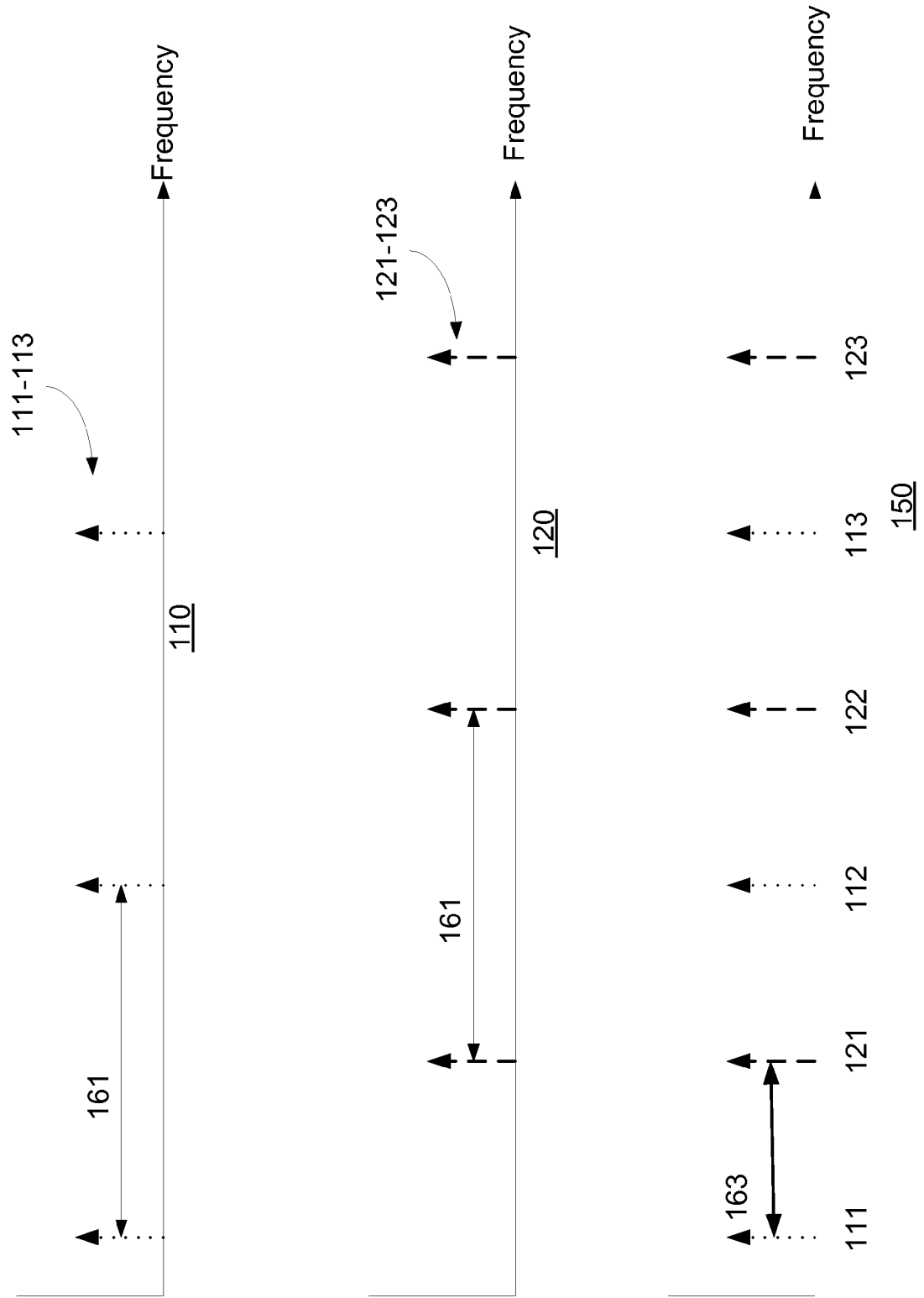
FIG. 2 illustrates multiple frequency grids according to an embodiment of the invention.

Referring to FIG. 2, first IFFT grid 110 includes arrows 111, 112 and 113 that represent the center frequencies of three frequency bins of the first IFFT grid 110. These frequency bins are spaced apart by a first spacing 161. It is noted that the number of frequency bins usually well exceeds three. For example, in a 64 IFFT filter there are 65 frequency bins.

The second IFFT and polyphase circuit 30(2) is arranged to receive the second set of baseband channels, to apply an IFFT operation (by IFFT filter 31(2)) to be followed by applying a polyphase filtering operation (by polyphase filter 32(2)) to provide a second set of converted channels that at least partially populates a second IFFT grid that comprises second frequency bins that are spaced apart from each other by the first spacing. The second IFFT grid can equal the first IFFT grid.

The frequency shifting module 40 is arranged to frequency shift at least one of the first set of converted channels and the second set of converted channels to provide an output set of sub-channels.

FIG. 1 illustrates that only the second set of converted channels is frequency shifted—by mixer 42(2) that frequency shift (in response to signal 42(2)) the second set of converted channels to provide interleaved grids—as illustrated in FIG. 2. It is noted that each of the sets of converted channels may be frequency shifted. Alternatively, only the first set of converted channels is frequency shifted.

Referring to FIG. 2, after the frequency shift, a second frequency shifted grid 120 is outputted from mixer 41(2) and includes arrows 121, 122 and 123 that represent the center frequencies of three frequency bins of the second frequency shifted grid 120. These frequency bins are spaced apart by the first spacing 161. It is noted that the number of frequency bins usually well exceeds three.

The output set of sub-channels (outputted from frequency shifting module 40) at least partially populates an output grid that includes output frequency bins that are spaced apart from each other by an output spacing that is smaller than the first spacing. Output sub-channels originating from the first set of converted channels and output sub-channels originating from the second set of the converted channels are of interleaving frequencies.

The combining circuit 50 is arranged to combine the output set of sub-channels to provide an interleaved output channel. The spectrum of the interleaved output channel is a superposition of the spectrums of the output sub-channels.

Referring to FIG. 2, output grid 150 includes (a) arrows 111, 112 and 113 that represent the center frequencies of three frequency bins of the first IFFT grid 110, and (b) arrows 121, 122 and 123 that represent the center frequencies of three frequency bins of the second frequency shifted grid 120. These arrows are interleaved. The spacing between the output frequency bins is denoted 163 and is smaller than the first spacing 161.

The following first example will further illustrate the operation of the digital up converter 10 of FIG. 1.

It is assumed that the first and second IFFT filters 31(1) and 31(2) have 32 inputs and an output grid of 32 frequency bins. The inputs to the digital up converter 10 are sampled at 40 Msps. Accordingly—the first spacing (X) equals 40 Mzh.

The interleaved output signal is sampled at 1280 Msps as the digital up converter 10 performs an up-sampling by a factor of 32.

Because there are 2 (M=2) IFFT filters the spacing between the output frequency bins equals (X/M) and equals 20 Mega-Hertz (Mhz).

The output frequency bin bandwidth (Y) equals 28 Mhz. Because the bandwidth of a baseband channel is about 6 MHz, up to four channels can be allocated within a single frequency bin—as long as channels resulting from different sets of baseband channels do not overlap.

It is assumed that the overall required transmission spectrum of the digital up converter 10 is 960 MHz, implying that only 48 out of the 64 maximal number of baseband channels are provided to the digital up converter 10. It also indicates that only 48 out of the 64 frequency bins of the interleaved output grid will be populated (20 MHz*48=960 Mhz).

A maximal number of sixty four baseband channels can be fed to first and second IFFT filters 31(1) and 31(2). In the current example only 48 baseband channels are provided to these filter and they are alternated between the first and second IFFT filters 31(1) and 31(2) so that the first IFFT filter 31(1) receives a first set of baseband channels that includes the odd baseband channels and the second IFFT filter 31(2) receives a second set of baseband channels that includes the even baseband channels.

In order to provide the desired interleaved output grid a frequency shift of 20 MHz should be introduced between the first and second sets of converted channels.

Figure 6:
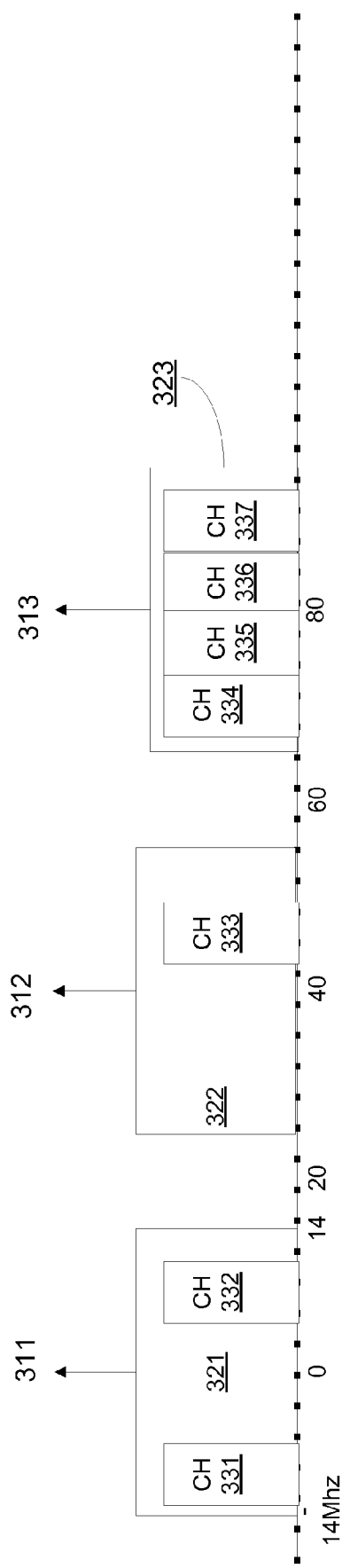
FIG. 6 illustrates frequency bins and channels according to an embodiment of the invention.
Figure 7:
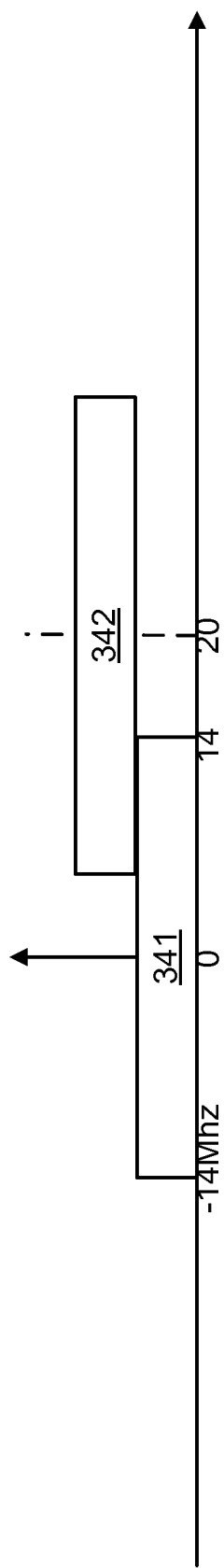
FIG. 7 illustrates frequency bins and channels according to an embodiment of the invention.

FIGS. 6 and 7 illustrate portions of the output grid according to an embodiment of the invention.

FIG. 6 illustrates first till third frequency bins 321, 322 and 323 each 28 Mhz wide, having centers 311, 312 and 313 at frequencies 0, 40 and 80 Mhz. First frequency bin 321 includes two 6 Mhz bandwidth channels 331 and 332 centered at about +8 Mhz and −8 Mhz. Second frequency bin 321 includes a single 6 Mhz bandwidth channel 333 centered at about +48 Mhz. Third frequency bin 323 includes four 6 Mhz bandwidth channels 334-337 that span across almost the entire third frequency bin.

FIG. 7 illustrate two partially overlapping frequency bins 341 and 342 of bandwidth 28 Mhz. Frequency bin 341 centered at 0 Mhz and frequency bin 342 centered at 20 Mhz.

Multiple (L) IFFT and Polyphase Circuit DUT

The number of IFFT may exceed two. In general, there may be multiple (L) IFFT and polyphase circuits. L may exceed two.

Figure 3:
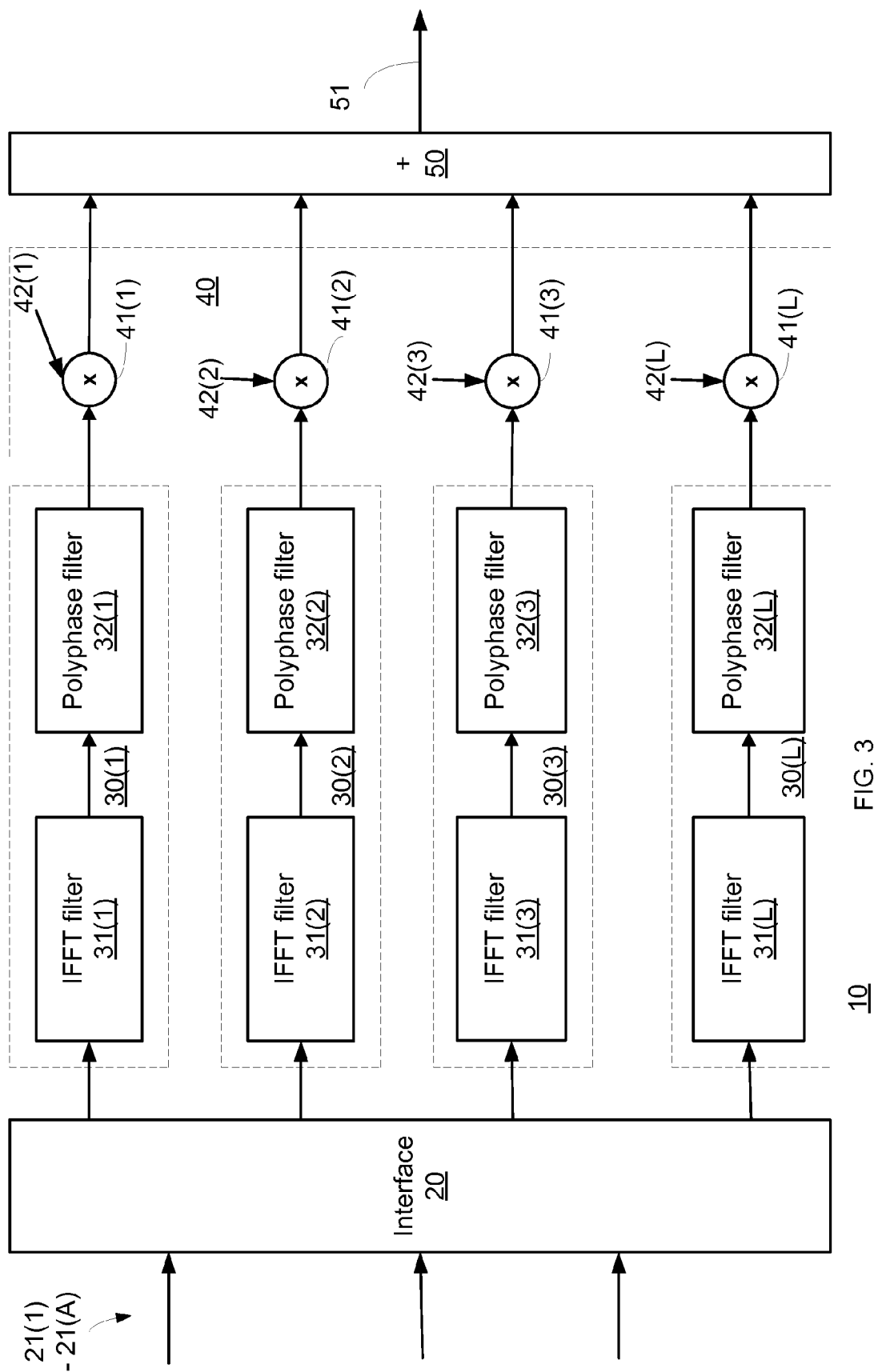
FIG. 3 illustrates a digital up converter according to an embodiment of the invention.
Figure 4:
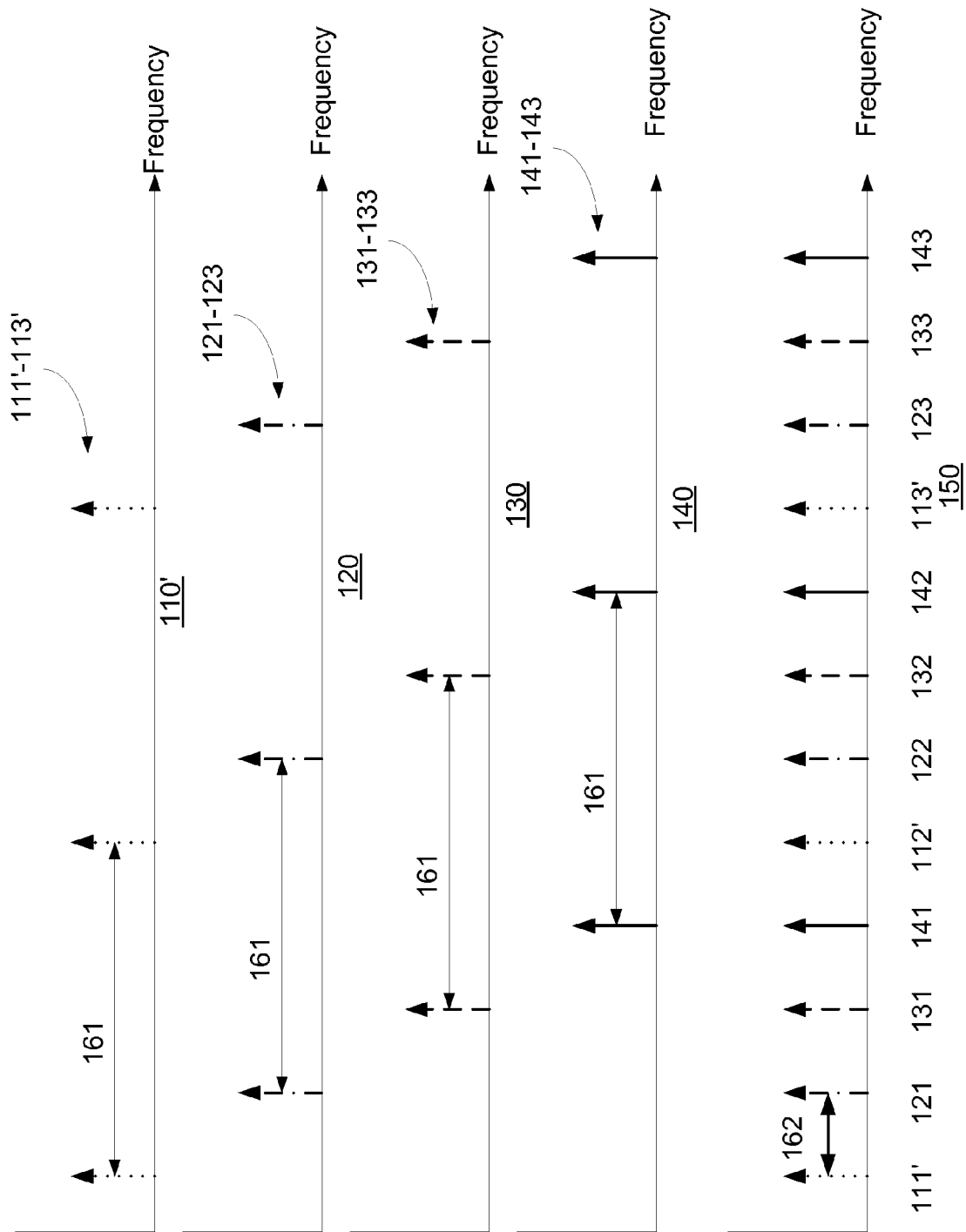
FIG. 4 illustrates multiple frequency grids according to an embodiment of the invention.

FIG. 3 illustrates a digital up converter 10 that include at least four (L≥4) IFFT and polyphase circuits 30(1)-30(L). These L IFFT and polyphase circuits are connected between interface 20 and frequency shifting module 40 that is illustrates as having a mixer (41(1)-41(L)) for each IFFT and polyphase circuit, each mixer fed by control signal 42(1)-42

(L). The frequency shifts can introduce frequency shifts of X/M between grids of different IFFT and polyphase circuits to provide an interleaved output signal.

The interface 20 is arranged to provide to different IFFT and polyphase circuits (out of 30(1)-30(L)) different sets of baseband channels. The different IFFT and polyphase circuits are arranged to apply the IFFT operation (by IFFT filters 31(1)-31(L)) and then to apply polyphase filtering operation (by polyphase filters 32(1)-32(L)) to provide different sets of converted channels that at least partially populate different IFFT grids that include different frequency bins. Frequency bins of a same IFFT grid (of the different IFFT grids) are spaced apart from each other by a first spacing. All different IFFT grids may be the same before being frequency shifted but this is not necessarily so.

The frequency shifting module 40 is arranged to frequency shift multiple sets (all or almost all) of the different sets of converted channels (there are L sets of converted channels—outputted from IFFT and polyphase circuits 30(1)-30(L) to provide the output set of sub-channels. The output set of sub-channels at least partially populates the output frequency grid, output sub-channels originating from different sets of converted channels are of interleaving frequencies.

Referring to FIG. 2 and assuming that L=4 then the output grid 150 includes:

a. Arrows 111', 112' and 113' that represent the center frequencies of three frequency bins of a first frequency shifted grid 110' outputted from first mixer 41(1).
b. Arrows 121, 122 and 123 that represent the center frequencies of three frequency bins of a second frequency shifted grid 120 outputted from second mixer 41(2).
c. Arrows 131, 132 and 133 that represent the center frequencies of three frequency bins of a third frequency shifted grid 130 outputted from third mixer 41(3).
d. Arrows 141, 142 and 143 that represent the center frequencies of three frequency bins of a fourth frequency shifted grid 140 outputted from fourth mixer 41(4).

These arrows are interleaved and the output grid include multiple sequences that include a frequency bin of the first frequency shifted grid is followed by a frequency bin of the second frequency shifted grid that in turn is followed by a frequency bin of the third frequency shifted grid that in turn is followed by a frequency bin of the fourth frequency shifted grid. Thus the order of arrows is 111, 121, 131, 141, 112, 122, 132, 142 and 113, 123, 133 and 143.

The spacing between the output frequency bins is denoted 163 and is smaller than the first spacing 161. In fact it equals one fourth of the first spacing as M=4.

The following second example will further illustrate the operation of the digital up converter 10 of FIG. 3. It is assumed that L=4 and that there are four IFFT and polyphase circuits.

It is assumed that all four IFFT filters 31(1), 31(2), 31(3) and 31(L) have 64 inputs and an output grid of 64 frequency bins. The inputs to the digital up converter 10 are sampled at 20 Msps. Accordingly—the first spacing (X) equals 20 Mzh.

The interleaved output signal is sampled at 1280 Msps as the digital up converter 10 performs an up-sampling by a factor of 64.

Because there are 4 (M=4) IFFT filters the spacing between the output frequency bins equals (X/M) and equals 5 Mega-Hertz (Mhz).

The output frequency bin bandwidth (Y) equals 12 Mhz. Because the bandwidth of a baseband channel is about 6 MHz, up to two channels can be allocated within a single frequency bin—as long as channels resulting from different sets of baseband channels do not overlap.

It is assumed that the overall required transmission spectrum of the digital up converter 10 is 960 MHz, implying that only 192 out of the 256 maximal number of baseband channels are provided to the digital up converter 10. It also indicates that only 192 out of the 256 frequency bins of the interleaved output grid will be populated (5 MHz*192=960 Mhz).

A maximal number of 256 baseband channels can be fed to first till fourth IFFT filters 31(1), 31(2), 31(3) and 31(L). In the current example only 192 baseband channels are provided to these filter and they are alternated between the first till fourth second IFFT filters so that the m'th IFFT filter 31(m), index m ranging between 1 and four (M), receives a first set of baseband channels that includes the {m+TRUNC(m/4)}'th baseband channels out of the 192 channels. For example, the first IFFT filter 31(1) receives baseband channels 1, 5, 9, 13, . . . 189; the second IFFT filter 31(2) receives baseband channels 2, 6, 10, 14, . . . 190; the third IFFT filter 31(3) receives baseband channels 3, 7, 22, 15, . . . 191; and the fourth the IFFT filter 31(L) receives baseband channels 4, 8, 12, 16, . . . 192.

In order to provide the desired interleaved output grid a frequency shift of 5 MHz should be introduced between the different sets of converted channels. For example, the first set of converted channels may be frequency shifted (by mixer 41(1)) by −2.5 Mhz, the second set of converted channels may be frequency shifted (by mixer 41(2)) by +2.5 Mhz, the third set of converted channels may be frequency shifted (by mixer 41(3)) by −7.5 Mhz and the fourth set of converted channels may be frequency shifted (by mixer 41(4)) by +7.5 Mhz. This is an example of a symmetrical frequency shifts in which the outputs of each pair of polyphase filters are frequency shifted in a symmetrical manner—having the same magnitude bur opposite sign of phase shifting.

Separately frequency shifting the output of each polyphase filter will require eight multipliers per pair of polyphase filters:

Use w=2πf. The 'Shift and Combine' equation is simply a sum of:

$$y=a(t)e^{jwt}+b(t)e^{-jwt}$$

One complex multiplication requires four multipliers:

$$a(t)e^{jwt}=(a_I+ja_Q)[\cos wt+j\sin wt]=(a_I \cos wt-a_Q \sin wt)+j(a_I \sin wt+a_Q \cos wt)$$

Accordingly—a straightforward solution in which each set of multipliers is allocated to a separate polyphase filter requires eight multipliers—two sets of multipliers.

Figure 12:
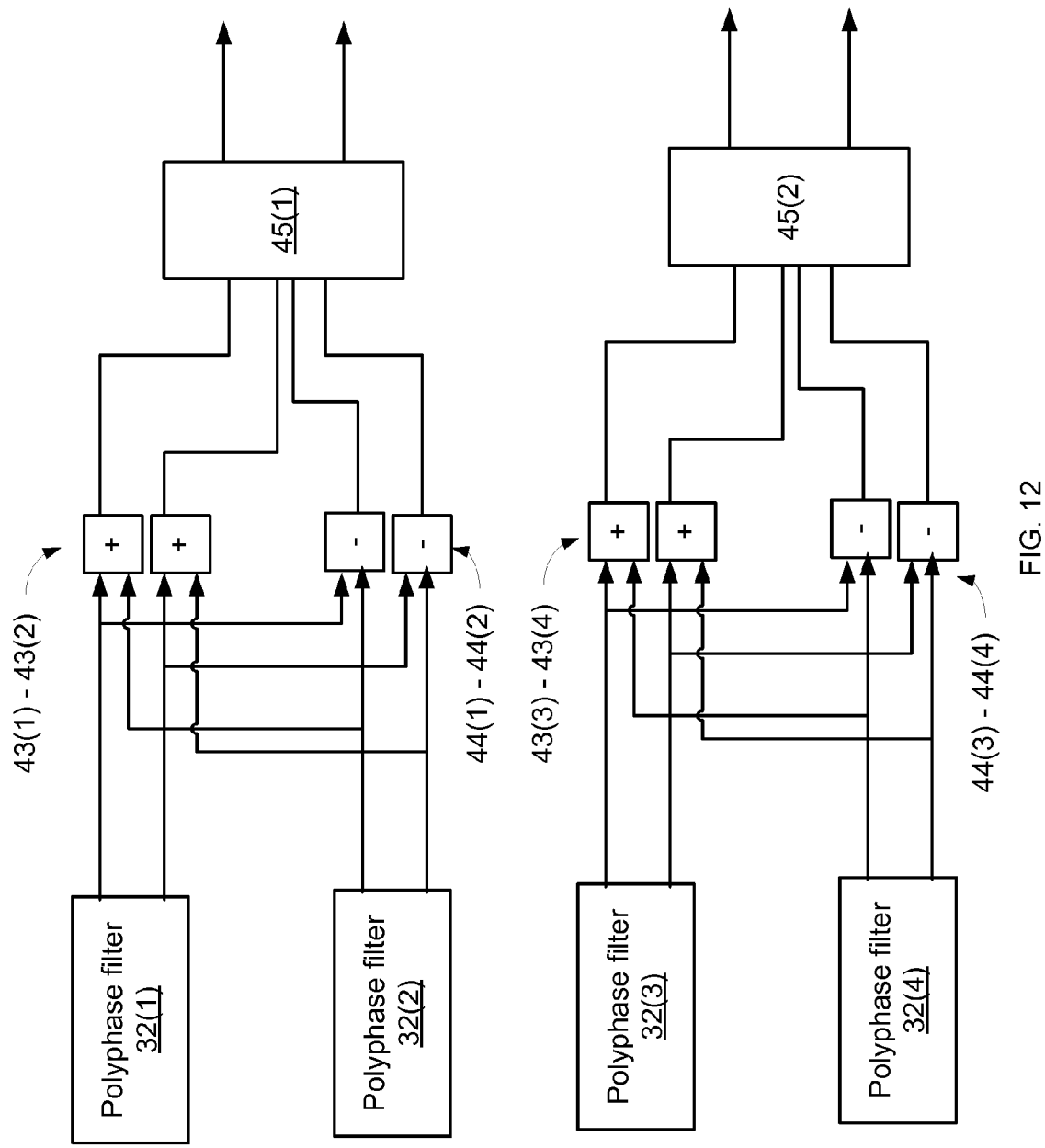
FIG. 12 illustrates a portion of the frequency shifting module according to an embodiment of the invention.

FIG. 12 illustrates polyphase filters 32(1)-32(4) and a frequency shifting module 40 according to an embodiment of the invention.

Instead of frequency shifting the output signals of each polyphase filter by separate multipliers, and using symmetrical frequency shifts of the output signals of the polyphase filters—the output signals of pairs of polyphase filters are combined before being fed to complex multipliers and thus resulting in a reduction in the number of multipliers desired to perform the frequency shift.

The sets of converted channels outputted from each polyphase filter are complex—and include real signals and imaginary signals. The first set of converted channels outputted from the first polyphase filter 32(1) is denoted a, a includes an imaginary part ai and a real part ar. The second set of converted channels outputted from the second polyphase filter 32(2) is denoted b, b includes an imaginary part bi and a real part br. It is assumed that a is frequency shifted by f Hertz and b is frequency shifted by −f Hertz.

Using the symmetry of the required frequency shifts (+w and −w), $$y=a(t)e^{jwt}+b(t)e^{-jwt}=a(t)[\cos wt+j \sin wt]+b(t)[\cos wt-j \sin wt]=[a(t)+b(t)] \cos wt+j[a(t)-b(t)] \sin wt$$

Defining
$c(t) \equiv a(t)+b(t)$, the sum of the two complex inputs, and
$d(t) \equiv a(t)-b(t)$, the difference of the two complex inputs, then $$y=c(t)\cos wt+jd(t)\sin wt$$

This can be further written as $$y=(c_I+jc_Q)\cos wt+j(d_I+jd_Q)\sin wt=(c_I \cos wt-d_Q \sin wt)+j(c_Q \cos wt+d_I \sin wt)$$

In FIG. 12, the real signals from polyphase filters 32(1) and 32(2) are added to each other by adder 43(1) and its output $c_I$ is fed to first set 45(1) of four multipliers. The real signals from polyphase filters 32(1) and 32(2) are subtracted from each other by subtraction unit 44(1) and its output $d_I$ is fed to the first set 45(1) of four multipliers.

The imaginary signals from polyphase filters 32(1) and 32(2) are added to each other by adder 43(2) and its output is fed to first set 45(2) of four multipliers. The imaginary signals from polyphase filters 32(1) and 32(2) are subtracted from each other by subtraction unit 44(2) and its output is fed to the first set 45(1) of four multipliers.

The first set of four multipliers 45(1) are arranged to generate the output set of sub channels by multiplying adder 43(1) output signals $c_I$, adder 43(2) output signals $c_Q$, subtraction unit 44(1) output signals $d_I$, subtraction unit 44(2) output signals by sinusoidal signals sin wt and cos wt.

In FIG. 12, the real signals from polyphase filters 32(3) and 32(4) are added to each other by adder 43(3) and its output $c_I$ is fed to second set 45(3) of four multipliers. The real signals from polyphase filters 32(3) and 32(4) are subtracted from each other by subtraction unit 44(3) and its output $d_I$ is fed to the second set 45(3) of four multipliers.

The imaginary signals from polyphase filters 32(3) and 32(4) are added to each other by adder 43(4) and its output is fed to second set 45(4) of four multipliers. The imaginary signals from polyphase filters 32(3) and 32(4) are subtracted from each other by subtraction unit 44(4) and its output is fed to the second set 45(3) of four multipliers.

The second set of four multipliers 45(3) are arranged to generate the output set of sub channels by multiplying adder 43(3) output signals $c_I$, adder 43(4) output signals $c_Q$, subtraction unit 44(3) output signals $d_I$, subtraction unit 44(4) output signals by sinusoidal signals sinwt and coswt.

Figure 8:
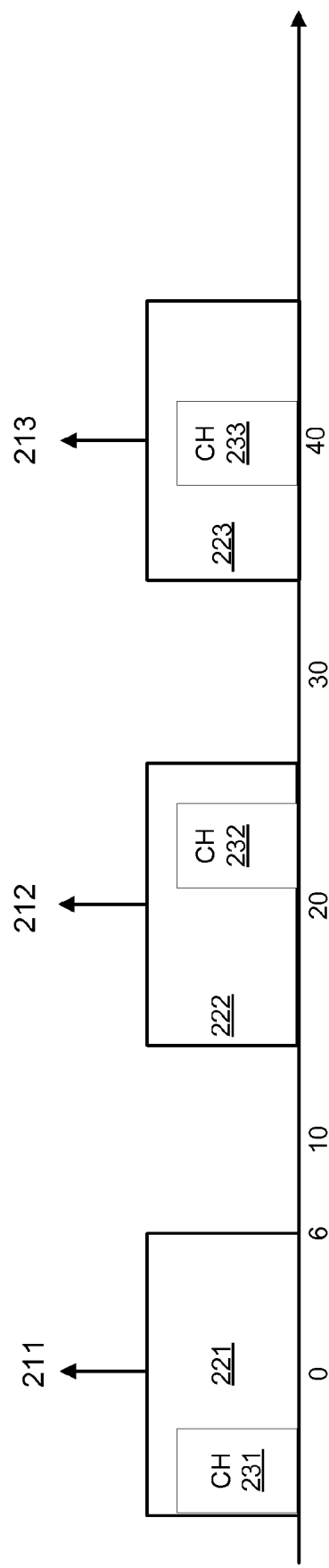
FIG. 8 illustrates frequency bins and channels according to an embodiment of the invention.
Figure 9:
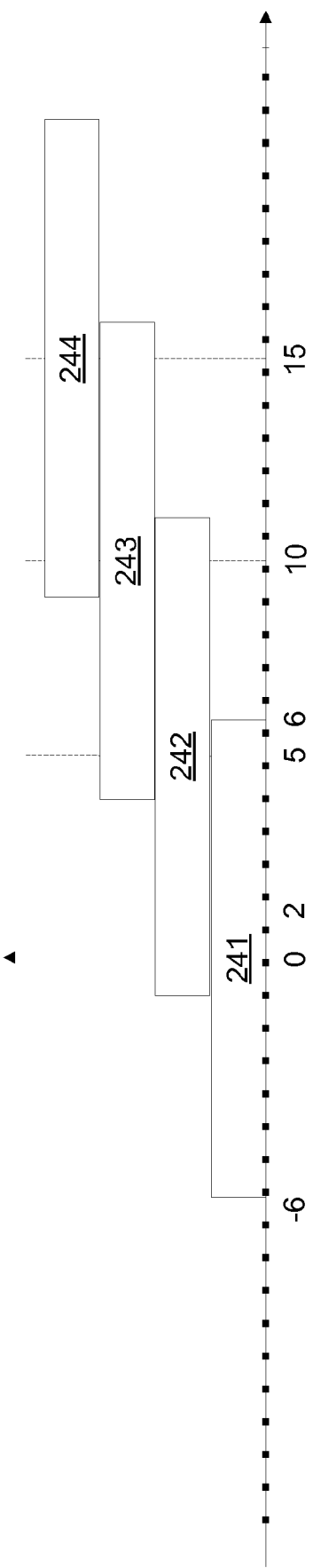
FIG. 9 illustrates frequency bins and channels according to an embodiment of the invention.

FIGS. 8 and 9 illustrate portions of the output grid according to an embodiment of the invention.

FIG. 8 illustrates first till third frequency bins 221, 222 and 223 each 12 Mhz wide, having centers 211, 212 and 213 at frequencies 0, 20 and 40 Mhz. First frequency bin 221 includes one 6 Mhz bandwidth channel 231 centered at about −2 Mhz. Second frequency bin 221 includes a single 6 Mhz bandwidth channel 232 centered at about +24 Mhz. Third frequency bin 223 includes a single 6 Mhz bandwidth channel 233 centered at about +40 Mhz.

FIG. 9 illustrate four partially overlapping frequency bins 241-244 of bandwidth 12 Mhz. Frequency bins 241-244 are centered at 0, 5, 10 and 15 Mhz respectively.

Baseband Frequency Shifting and Guard Band

The allocation of channels can require baseband frequency shifting in order to locate a baseband channel within a required location within a frequency bin. Furthermore, guard bands may be presented.

At the input of each IFFT and polyphase circuit the baseband channels are assumed to be placed at the suitable frequency offset relative the destined frequency bin. For example a specific 6 Mhz channel needs to be transmitted at center frequency 102 Mhz. Assume that the closest output frequency bin is positioned at 100 Mhz then the baseband channel needs to be intra-frequency bin frequency shifted by +2 Mhz.

An intra-frequency bin frequency shift means a frequency shift within a frequency bin—by a shift that does not exceed the bandwidth of the frequency bin.

In case that several channels need to be allocated into the same output frequency bin (see, for example, FIG. 8), the baseband channels are combined after the adequate intra-frequency bin frequency shift was performed per baseband channel.

Figure 5:
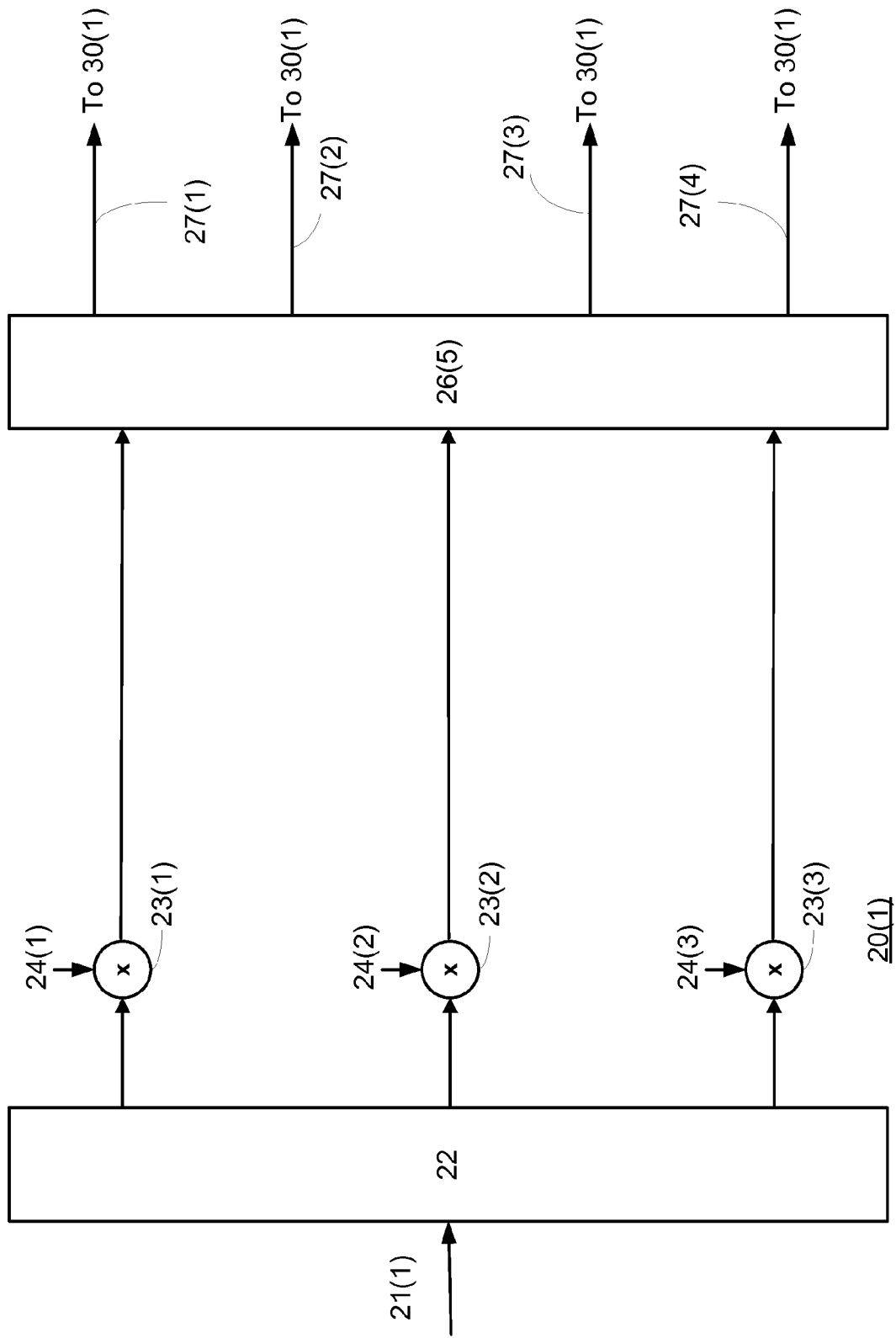
FIG. 5 illustrates a portion of an interface of a digital up converter of FIG. 3 according to an embodiment of the invention.

FIG. 5 illustrates a portion 20(1) of an interface 20 of a digital up converter 10 of FIG. 3 according to an embodiment of the invention.

Portion 20(1) includes an input 21(1) that is followed by de-multiplexer 22 that allocates baseband channels sets of 16 baseband channels each to baseband mixers 23(1), 23(2) and 23(3) that perform (is required) intra-frequency bin frequency shifting (controlled by control signals 24(1), 24(2) and 24(3) respectively). For example the 2 Mhz frequency shift mentioned above can be applied by one or the baseband mixers.

Each one of baseband mixers 23(1), 23(2) and 23(3) is arranged to provide sixteen baseband channels (that may have undergone intra-frequency bin frequency shift) to a guard channel insertion module 26(5). The guard channel insertion module 26(5) receives 48 baseband channels and outputs 64 channels—48 baseband channels and 12 guard bands—6 guard bands followed (in the frequency domain) by the 48 baseband channels that are followed by other 6 guard bands. In FIG. 5 the guard channel insertion module 26(5) has three inputs and four outputs 27(1)-27(4)—all are coupled (for example via de-multiplexer) to first IFFT and polyphase module 30(1). The insertion of guard bands can be performed by any known manner-such as zero padding.

Method

According to an embodiment of the invention there may be provided a method for digital up conversion according to an embodiment of the invention.

The method can be executed by any one of the digital up converters 10 illustrated above.

Figure 11:
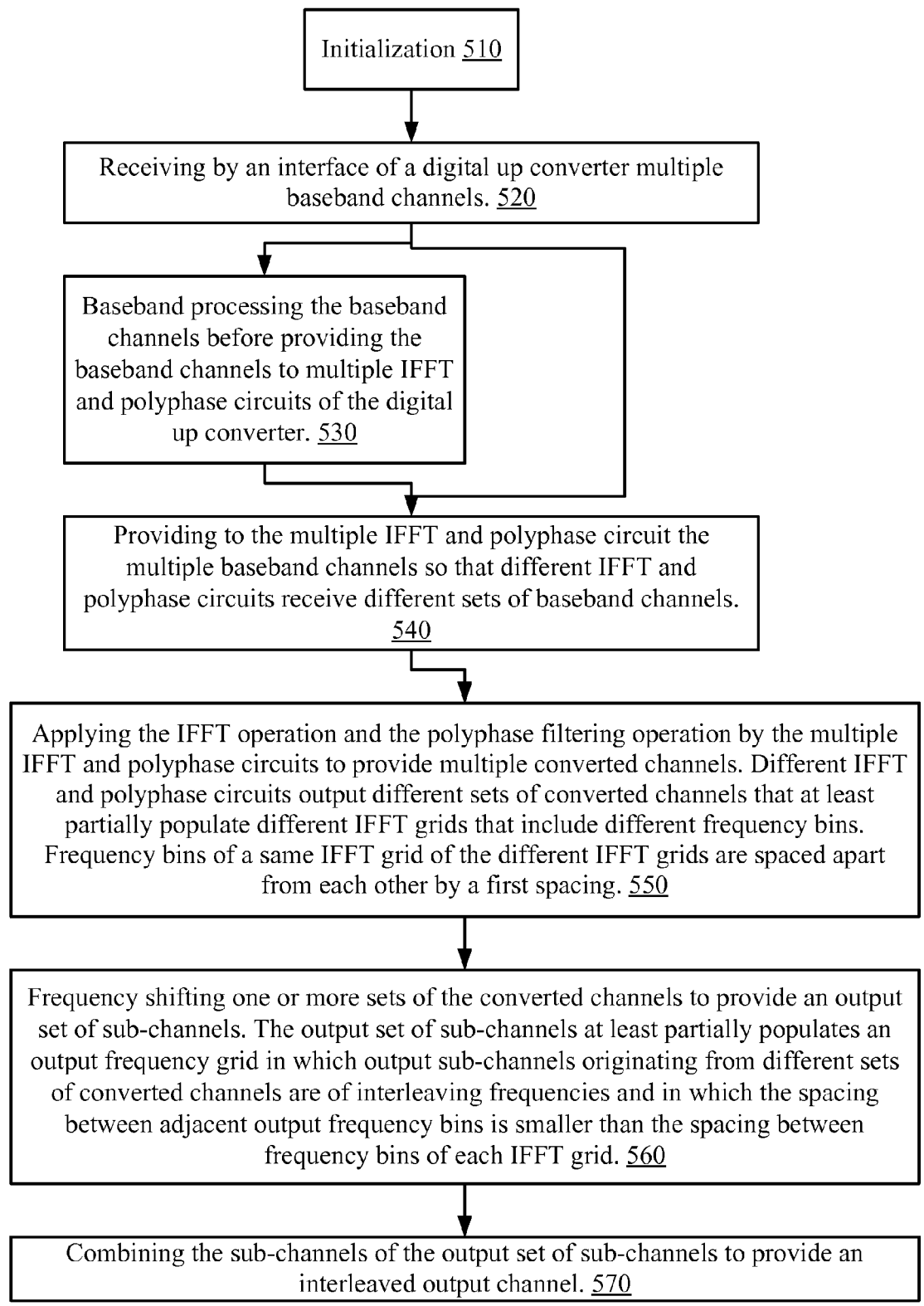
FIG. 11 illustrates a method according to an embodiment of the invention.

FIG. 11 illustrates method 500 according to an embodiment of the invention.

Method 500 may start by initialization stage 510.

Initialization stage 510 may include configuring a digital up converter to provide channels at desired output frequencies.

Stage 510 may be followed by stage 520 of receiving by an interface of a digital up converter multiple baseband channels.

Stage 520 may be followed by stage 530 or by stage 540. Stage 530 may be followed by stage 540.

Stage 530 may include baseband processing the baseband channels before providing the baseband channels to multiple IFFT and polyphase circuits of the digital up converter. The processing may include at least one out of (a) performing, by baseband frequency shifters, intra-frequency bin frequency shift of baseband channels according to the desired output frequencies; and (b) guard band insertion.

Stage 540 include providing to the multiple IFFT and polyphase circuit the multiple baseband channels so that different IFFT and polyphase circuits receive different sets of baseband channels.

Stage 540 may be followed by stage 550 of applying the IFFT operation and the polyphase filtering operation by the multiple IFFT and polyphase circuits to provide multiple converted channels. Different IFFT and polyphase circuits output different sets of converted channels that at least partially populate different IFFT grids that include different frequency bins. Frequency bins of a same IFFT grid of the different IFFT grids are spaced apart from each other by a first spacing. At this point the different IFFT grids may partially overlap, fully overlap or be non-overlapping. In the example set forth in previous figures it was assumed that the different IFFT grids (before being frequency shifted) are equal to each other.

Stage 550 may be followed by stage 560 of frequency shifting one or more sets of the converted channels to provide an output set of sub-channels. The output set of sub-channels at least partially populates an output frequency grid in which output sub-channels originating from different sets of converted channels are of interleaving frequencies and in which the spacing between adjacent output frequency bins is smaller than the spacing between frequency bins of each IFFT grid.

Stage 560 may be followed by stage 570 of combining the sub-channels of the output set of sub-channels to provide an interleaved output channel.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

I claim:

1. A digital up converter, comprising:
   a first inverse fast Fourier transform (IFFT) and polyphase circuit that is arranged to receive a first set of baseband channels, to apply an IFFT operation and a polyphase filtering operation to provide a first set of converted channels that at least partially populates a first IFFT grid that comprises first frequency bins that are spaced apart from each other by a first spacing;
   a second IFFT and polyphase circuit that is arranged to receive a second set of baseband channels, to apply the IFFT operation and the polyphase filtering operation to provide a second set of converted channels that at least partially populates a second IFFT grid that comprises second frequency bins that are spaced apart from each other by the first spacing;
   a frequency shifting module that is arranged to frequency shift at least one of the first set of converted channels and the second set of converted channels to provide an output set of sub-channels that at least partially populates an output grid that comprises output frequency bins that are spaced apart from each other by an output spacing that is smaller than the first spacing; wherein output sub-channels originating from the first set of converted channels and output sub-channels originating from the second set of the converted channels are of interleaving frequencies; and
   a combined circuit that is arranged to combine the output sub-channels to provide an interleaved output channel, wherein the output spacing is one half of the first spacing.

2. The digital up converter according to claim 1 wherein the frequency shifting module is arranged to frequency shift only one of the first and second sets of converted channels.

3. The digital up converter according to claim 1 wherein the frequency shifting module is arranged to frequency shift each one of the first and second sets of converted channels.

4. The digital up converter according to claim 1 comprising an interface that is arranged to receive multiple baseband channels, the multiple baseband channels comprise the first and second sets of baseband channels, to direct the first set of baseband channels to the first IFFT and polyphase circuit and to direct the second set of baseband channels to the second IFFT and polyphase circuit.

5. The digital up converter according to claim 4, wherein the interface comprises baseband frequency shifters arranged to perform intra-frequency bin frequency shift of baseband channels according to desired frequencies of output sub-channels originating from the baseband channels.

6. The digital up converter according to claim 1 comprising a pilot channel circuit arranged to supply information to be mapped to pilot bands of the interleaved output channel.

7. The digital up converter according to claim 1 wherein the first frequency bin is wider than at least twice a bandwidth of a baseband channel of the first set of baseband frequency channels.

8. The digital up converter according to claim 1 wherein the first frequency bin is wider than a bandwidth of a baseband channel of the first set of baseband channels and is narrower than twice the bandwidth of the baseband channel of the first set of baseband frequency channels.

9. The digital up converter according to claim 1 wherein the first and second IFFT and baseband circuits belong to a group of multiple IFFT and baseband circuits, the group comprises at least one additional IFFT and baseband circuit that differs from the first and second IFFT and baseband circuits;
   wherein different IFFT and polyphase circuits are arranged to receive different sets of baseband channels, to apply the IFFT operation and the polyphase filtering operation to provide different sets of converted channels that at least partially populate different IFFT grids that comprise different frequency bins, wherein frequency bins of a same IFFT grid of the different IFFT grids are spaced apart from each other by a first spacing;
   wherein the frequency shifting module that is arranged to frequency shift multiple one or more sets of converted channels to provide the output set of sub-channels, the output set of sub-channels at least partially populates the output frequency grid, wherein output sub-channels originating from different sets of converted channels are of interleaving frequencies.

10. The digital up converter according to claim 1 wherein a number of IFFT and polyphase circuits exceeds three.

11. The digital up converter according to claim 1 wherein the output spacing is smaller than one third of the first spacing.

12. The digital up converter according to claim 1 comprising a first adder for adding real signals of the first and second sets of converted channels to provide first adder output signals, a second adder for adding imaginary signals of the first and second sets of converted channels to provide second adder output signals; a first subtraction unit for subtracting real signals of the first set of converted channels from real signals of the second set of converted channels to provide first subtraction unit output signals; a second subtraction unit for subtracting imaginary signals of the first set of converted channels from imaginary signals of the second set of converted channels to provide second subtraction unit output signals; and a set of four multipliers that are arranged to generate the output set of sub channels by multiplying the first adder output signals, the second adder output signals, the first subtraction unit output signals, the second subtraction unit output signals by sinusoidal signals.

13. A method, comprising:
   providing to multiple inverse fast Fourier transform (IFFT) and polyphase circuits multiple baseband channels so that different IFFT and polyphase circuits receive different sets of baseband channels;
   applying IFFT operations and the polyphase filtering operations by the multiple IFFT and polyphase circuits to provide multiple converted channels; wherein different IFFT and polyphase circuits output different sets of converted channels that at least partially populate different IFFT grids that comprise different frequency bins;

wherein frequency bins of a same IFFT grid of the different IFFT grids are spaced apart from each other by a first spacing;

frequency shifting one or more sets of the converted channels to provide an output set of sub-channels; wherein the output set of sub-channels at least partially populates an output frequency grid in which output sub-channels originating from different sets of converted channels are of interleaving frequencies and in which the spacing between adjacent output frequency bins is smaller than the spacing between frequency bins of each IFFT grid; and combining the sub-channels of the output set of sub-channels to provide an interleaved output channel, wherein the output spacing is one half of the first spacing.

14. A digital up converter, comprising:

two or more inverse fast Fourier transform (IFFT) and polyphase circuits that are each arranged to receive a set of baseband channels and to apply an IFFT operation and a polyphase filtering operation so that each of the two or more inverse fast Fourier transform (IFFT) and polyphase circuits provides a set of converted channels that at least partially populates a IFFT grid which comprises frequency bins that are spaced apart from each other by a bin spacing;

a frequency shifting module that is arranged to frequency shift at least one of the sets of converted channels to provide an output set of sub-channels that at least partially populates an output grid that comprises output frequency bins that are spaced apart from each other by an output spacing that is smaller than the bin spacing, wherein output sub-channels originating from different converted channels and output sub-channels are of interleaving frequencies; and a combined circuit that is arranged to combine the output sub-channels to provide an interleaved output channel, wherein the output spacing is the bin spacing divided by a total number of the two or more inverse fast Fourier transform (IFFT) and polyphase circuits.

\* \* \* \* \*